United States Patent

[11] 3,589,117

| [72] | Inventor | William R. Wadsworth<br>Route 2, Clyde, Ohio 43410 |
|---|---|---|
| [21] | Appl. No. | 719,888 |
| [22] | Filed | Apr. 9, 1968 |
| [45] | Patented | June 29, 1971 |

[54] HARVESTING APPARATUS
30 Claims, 8 Drawing Figs.

[52] U.S. Cl.................................................. 56/327 R,
    171/38, 171/40, 171/42, 171/61
[51] Int. Cl........................................................ A01d 45/26
[50] Field of Search............................................. 56/327 R,
    121.42, 327; 171/55, 56, 57, 58, 60, 61, 62, 18, 38,
    42, 37, 40

[56] References Cited
UNITED STATES PATENTS

| 938,881 | 11/1909 | Lee et al. | 171/57 X |
|---|---|---|---|
| 1,301,006 | 4/1919 | Prior | 171/62 X |
| 3,168,145 | 2/1965 | Gunkel et al. | 171/61 |
| 3,198,259 | 8/1965 | Manuel | 171/40 X |
| 894,262 | 7/1908 | Ellinwood | 171/61 X |
| 1,273,756 | 7/1918 | Fanger | 171/57 X |
| 1,306,673 | 6/1919 | Daniels | 171/63 X |
| 1,809,542 | 6/1931 | Bardsley et al. | 56/119 |
| 2,418,575 | 4/1947 | Christiansen | 171/61 X |
| 2,547,878 | 4/1951 | Marshall | 56/327 X |
| 3,194,318 | 7/1965 | Boyer | 171/18 |

FOREIGN PATENTS

| 21,833 | 1/1917 | Denmark | 171/38 |

*Primary Examiner*—Louis G. Mancene
*Assistant Examiner*—J. A. Oliff
*Attorney*—Myron E. Click ABSTRACT: A machine for harvesting vegetables having an edible head portion to be separated from a stem portion including a carriage to be advanced on the ground along a row of the vegetables, cutters on the carriage for trimming the stems from the heads, conveyor rollers for grasping and pulling down on a stem while conveying the stem and head to the cutter, and means for orienting the stem and head of a vegetable in that row for engagement by the stem-grasping means. The orienting means may include coacting lifting conveyor rollers on each side of the row to be advanced beneath a head and endless gathering conveyors having substantially vertically disposed and rearwardly moving runs supported in spaced opposing relationship on each side of the row to contact and center the heads. Second aligning side conveyors above the stem-grasping means and the cutter means provides a right angle stem cut.

FIG. 1

INVENTOR.
WILLIAM F. WADSWORTH

FIG. 4

INVENTOR.
WILLIAM F. WADSWORTH
ATTORNEY

INVENTOR.
WILLIAM F. WADSWORTH

BY Myron E. Click

ATTORNEY

HARVESTING APPARATUS

Many features of this invention are adapted to the harvesting of vegetables in general, however the preferred embodiment of the invention shown herein has been especially adapted to the harvesting of cabbages or other vegetables having an edible head portion as described in the above abstract.

Heretofore, it has been customary to harvest cabbage and other edible head vegetables by hand, cutting each cabbage head from a stalk. Storage cabbage, known commonly as "market" cabbage for use on the table, after being cut from its stem, is usually placed in bushel baskets disposed in convenient points along the cabbage rows in the field; and the baskets must thereafter be picked up and transported away. Kraut cabbage, generally larger cabbage heads which are used to make sauerkraut, after being cut from their stems has to be thrown by pitchfork into a transport wagon. A good worker has been able to harvest at most about five to eight tons of cabbage a day. This manual harvesting of cabbage is laborious, time-consuming and expensive.

Several attempts have been made in the past to provide an automatic cabbage harvester to improve the speed of harvesting and reduce the manual labor involved. However, such machines have been useful in only very tightly controlled experimental conditions and few of the machines are in actual use. The problems involved in harvesting cabbage are now approaching a critical juncture because of the shortage of labor generally and the inexperience of that labor force that is available. Inexperienced cabbage harvesters either cannot manually produce the necessary tons per day or, in attempting to produce the necessary tonnage, ruin or spoil a relatively large percentage of the cabbage that is harvested.

Accordingly, it is an object of this invention to provide a harvester which will eliminate the harvesting of certain vegetables by hand, and substantially reduce the number of hours it takes to harvest a field of such vegetables.

Another object of this invention is to provide a cabbage-harvesting machine which removes the stems and/or the outer leaves from uprooted cabbage heads, and thereafter separates the cabbage heads from the severed stems and leaves.

A further object of this invention is to provide a cabbage-harvesting machine which is able, without adjustment, to harvest and trim both market cabbage and kraut cabbage, as well as varying sizes of each.

A still further object of this invention is to provide a machine for harvesting cabbage which can consistently cut the stem from the head at a right angle thereto to provide a cabbage head that is ready for coring-by-coring machines at a kraut-producing plant.

As noted hereinbefore attempts have been made previously to provide head harvesting machinery. Examples are noted in Pat. No. 894,262, issued July 28, 1908, to A. G. Ellinwood and in U.S. Pat. No. 3,194,318, issued July 13, 1965, to E F. Boyer.

In the Ellinwood patent a pair of shovellike projections dig around and lift the cabbage heads to a pair of endless belts running parallel to each other and having rods pointing toward each other to form conveying elements. The Ellinwood apparatus has difficulty in accommodating various sizes of cabbage heads in this conveyor and does not orient the head and stem for satisfactory stem severing by a pair of worm augers holding the stem and a disc cutter. When the Ellinwood machine elevates the cabbage it does so by a free lift. Thus, neither the stem nor the head is grasped by the machine, thus if the stem breaks or the cabbage is tilted before cutting or grasping by the worms there is no control of the head and the stem is not properly severed from the head.

In the Boyer apparatus the heads are again shoveled onto a pair of endless conveyors which are tilted toward each other and a rotating tire is utilized above the two conveyors to hold the head down while the stem is severed therefrom. The overhead tire is one embodiment of an overhead endless belt for holding the cabbage in position. Again the head is not centered or oriented or retained in an oriented position so that the stem may be cut from the same place on each cabbage head, or so the stem may be cut at a right angle to the stem and the head, since the stem may be pointing in any direction. If the head angles or lays over to one side when received by the overhead belt or tire then the head stays angled. When such an overhead belt is utilized, even with augers for pulling down on the stem, when the augers try to orient the head by pulling down on the stem the top and/or sides of the cabbage head are bruised, shredded, or abraded, or the stem may be pulled off by the augers.

Other attempts have been made in the prior art for providing a pair of coacting augers or conveying rollers to hold vegetables during harvesting. U.S. Pat. No. 2,547,878, issued Apr. 3, 1951, to D. B. Marshall is an example thereof for harvesting beets. However, when harvesting root crops as opposed to head crops, there is no problem of "top-heavy" head orientation when topping vegetables, as opposed to the difficulties when dealing with a top-heavy head of cabbage, for example, where a heavy head is to be separated from a relatively light root structure. Even so there has been no use in the prior art of a centering or aligning of a sugar beet or similar vegetable with respect to helix or worm-type coacting conveyors so that the tops are properly grasped therein and the tops are removed therefrom at a desired angle between the tops and the edible root structure. Accordingly, the teachings of this invention are intended to be applied not only to the harvesting of edible head vegetables but also edible root vegetables even though particularly useful in harvesting "head" vegetables.

This invention features apparatus for carrying out the above objects and overcoming the problems encountered heretofore in this area of harvesting which includes a carriage adapted to be advanced on the ground along a row of such vegetables, cutter means on the carriage for trimming one portion of the vegetable from the other portion, means for grasping and pulling tight the nonedible portion of the vegetable while conveying the grasped and edible portions of the vegetable to the cutter means, and means for orienting the edible and nonedible portions of the vegetable for engagement by the grasping means.

When applied to the harvesting of edible head vegetables such as cabbage, the grasping means pulls down on the stem thereof while conveying the stem and head to the cutter means, and the orienting means orients the stem and the head of the cabbage in the row for engagement by the stem-grasping means.

The orienting means may include means for lifting the head from the ground and centering the head and stem with respect to the grasping means. The lifting means may include coacting lifter conveyor rollers having forward portions supported in spaced relationship on each side of the row to be advanced beneath a head portion. The lifting conveyor rollers have rear portions which converge toward each other to feed a stem and head to the stem-grasping means. Means are provided for driving the lifting conveyor rollers at a conveying rate at least sufficient to move the head and stem along a converging lifting roller as fast as the carriage moves along the row. Advantageously, the lifting conveyor rollers are driven at a conveying rate in excess of carriage speed to permit centering of the head and stem by both rollers at the convergence thereof before engagement by the stem-grasping means. The lifting conveyor rollers advantageously carry spiral ribs thereon to assist in the lifting and conveying action thereof. Further, each lifter conveyor roller may have a forwardly tapered front end to assist in advancing the roller under and in lifting a head for conveying by the roller.

The orienting means may also include endless gathering conveyors having substantially vertically disposed and rearwardly moving runs supported in spaced, opposing relationship on each side of the row to contact and center the head. The rear portion of the opposing runs of the gathering conveyors preferably converge towards each other. The opposing runs are advantageously yieldingly biased toward each other in a predetermined spaced relationship. The biasing means may include first resilient means connecting the gathering conveyors intermediate the length of the opposing runs, and second resilient means connecting the gathering conveyors at the rear portions of the opposing runs.

The opposing runs of the gathering conveyors are preferably driven at a conveying rate faster than the ground movement of the carriage to permit gathering and centering of a head that is out of line or off of center before the grasping means arrives at the stem of the head. Each run advantageously carries a plurality of outwardly extending elements spaced on the run to permit positive engagement of the run with a head.

Opposing runs of the gathering conveyors are advantageously arched toward each other to permit rapid initial coarse centering of a head, the rearward portions of the converging arches permitting coaction by the opposing runs for vernier-centering adjustments.

Each gathering conveyor may include end shafts journally supported in a frame means. The frame means may include a telescoping section and means for yieldingly biasing the telescoping section to maintain a predetermined tension on the run of the conveyor.

The grasping means may include coacting conveyor rollers and means for rotating the rollers to pull a stem down between same. The grasping rollers may also carry spiral ribs thereon to assist in the conveying and grasping action thereof. The grasping conveyor rollers are advantageously driven at a conveying rate substantially equal to the ground speed of the carriage. The grasping conveyor rollers may converge toward each other from the front portions thereof to permit the entrance and engagement of a variety of stem sizes.

Nipper rolls may be disposed beneath cutter means at the end of the grasping conveyor rollers for forcibly and positively engaging severed stems and ejecting them from the machine to prevent jamming. The height of the cutter means above the grasping means may be adjustable to permit selective removal of stems only and stems along with a predetermined amount of outer leaf structure.

The invention also advantageously includes second aligning means comprising endless aligning conveyors having substantially vertically disposed and rearwardly moving runs supported in a spaced opposing relationship, above the grasping means and the cutting means, to hold a head in a predetermined position for cutting the stem at a desired angle. The desired angle is usually at a right angle with respect to the stem and the cabbage head. The aligning conveyors are constructed in a similar fashion to the gathering conveyors and are driven at substantially the same conveying rate as the grasping means. The aligning conveyors have the opposing runs thereof yieldingly biased in a predetermined spaced relationship to insure a sufficient separation to permit entry of a head therebetween and the adjustment of the spacing along the runs to accommodate different size heads. The aligning conveyors preferably are of the length to carry a severed head to a collecting station.

The aligning conveyors are advantageously spaced from the gathering conveyors so that a head and a stem rides a short distance on the coacting main augers to permit a further orientation and seating of the head on and the stem in the main augers. In this short distance there is no contact between either of the aligning or gathering conveyors with the cabbage head.

A slide plate or surface to the rear of the cutting means and below the aligning conveyors prevents a small head disposed between two larger heads from escaping from the control of the aligning conveyors before reaching a collecting station.

The apparatus herein also advantageously includes a collecting station for receiving a severed head comprising a collecting conveyor and diverting means spaced above the collecting conveyor for pushing the head from the collecting conveyor while permitting loose leaves to be carried onward. The collecting station may also include a collecting bin for receiving heads from a collecting conveyor and a bin conveyor means for moving the heads to a discharge position. The bin conveyor means may comprise a plurality of spaced tubular conveyor rollers which convey the heads while permitting loose leaves to fall between the rollers.

Other objects, features and advantages of this invention will become apparent when the following description is taken in conjunction with the accompanying drawings, in which.

Referring to FIGS. 1 through 4 there is illustrated apparatus embodying the teachings of this invention which includes a carriage generally indicated at 7 rollably supported by wheels 8 and 9 attached to a main frame 11. A tilting frame generally indicated at 13 is pivotally supported on main frame 11 by pivot assemblies 15. The tilting frame comprises longitudinal beams 14, upper cross brace members 16, and one or more lower cross brace beams or members 17. A hydraulic apparatus, controlled from the tractor or other pulling means (not shown) may be utilized to lower the tilting frame 13 to a harvesting position and raise it from the harvesting position to a traveling position when moving from field to field.

A pickup station for the cabbages or other vegetables being harvested is indicated generally at 19 and comprises orienting means including coacting lifting conveyor rollers 20 and 30 having forward tapered portions 23 and 33 supported in spaced relationship on each side of a row to be advanced beneath a head, and endless gathering conveyor means 40 and 50 having substantially vertically disposed and rearwardly moving runs 41 and 51 (best seen in FIG. 4) supported in spaced opposing relationship on each side of the row to contact and center the heads.

The coacting lifter conveyor rollers 20 and 30 have rear portions which converge toward each other to feed a stem and head to a stem-grasping means including a left main auger 60 and a right main auger 70. Mechanical links 172 and 182 from lower gearboxes 201 and 211 provide driving connections to drive housings 21 and 31 and, via gearing arrangements therein and in housing extensions 24 and 34, drive rollers 20 and 30 at a conveying rate at least sufficient to move the head and stem along a converging lifting roller as fast as the carriage moves along the row. Since cabbage heads do not always grow directly in line on the row, but frequently to the left or right depending upon the direction the stalk or stem grows, the lifting conveyor rollers 20 and 30 are driven at a conveying rate in excess of carriage speed to permit centering of the head and stem by both rollers at the convergence thereof before engagement by the stem-grasping means.

It is to be noted that the lifting conveyor rollers enable the pickup of smaller heads, particularly to be found in market cabbage, so that the heads are lifted above the converging portion of the pickup station to prevent the heads from becoming jammed at the convergence and stopping operation of the machine. The conveyors roll upwardly and outwardly so that the head is lifted above the convergence and the stem is oriented thereby in cooperation with the convergence of the opposing runs 41 and 51 to orient the head, even though small, and the stem for entry into the stem-grasping means.

Figure 3:
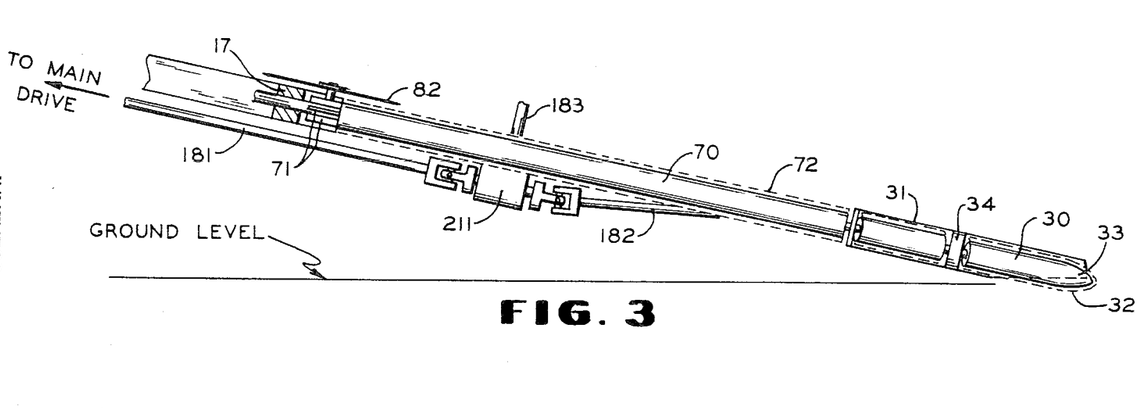
FIG. 3 is a side elevational view of the apparatus illustrated in FIG. 2.

The lifting conveyor rollers 20, 30 advantageously carry spiral ribs 22, 32 thereon to assist in the lifting and conveying action thereof. Each roller 20, 30 has a forwardly tapered front end 23, 33 to assist in lifting a head for conveying by the roller. As shown in FIG. 3, the tapered ends may be inserted into the ground.

As noted hereinbefore the endless gathering conveyors have substantially vertically disposed and rearwardly moving runs 41, 51 supported in spaced opposing relationship on each side of the row to contact and center the heads. The rear portions of the opposing runs of the gathering conveyor converge toward each other.

The opposing runs 41, 51 are yieldingly biased in a predetermined spaced relationship by a first resilient means and biasing assembly 221 connecting the gathering conveyors intermediate the length of the opposing runs, and second resilient means and biasing assembly 225 connecting the gathering conveyors at the rear portions of the opposing runs.

Each gathering conveyor 40, 50 includes end shafts 43, 53 supported in a frame means 45, 55 including a telescoping section 46, 56 and spring means 47, 57 for yieldingly biasing the telescoping section to maintain a predetermined tension on the runs 41, 51 of the conveyors 40, 50.

The opposing runs 41, 51 of the gathering conveyors 40, 50 are arched toward each other by track means 44, 54 attached to the support frames 45, 55. This permits the rapid initial coarse centering of a head contacted by the opposing runs. The rearward portions of the converging arches permit coaction by the opposing runs 41, 51 for vernier-centering adjustment.

Figure 1:
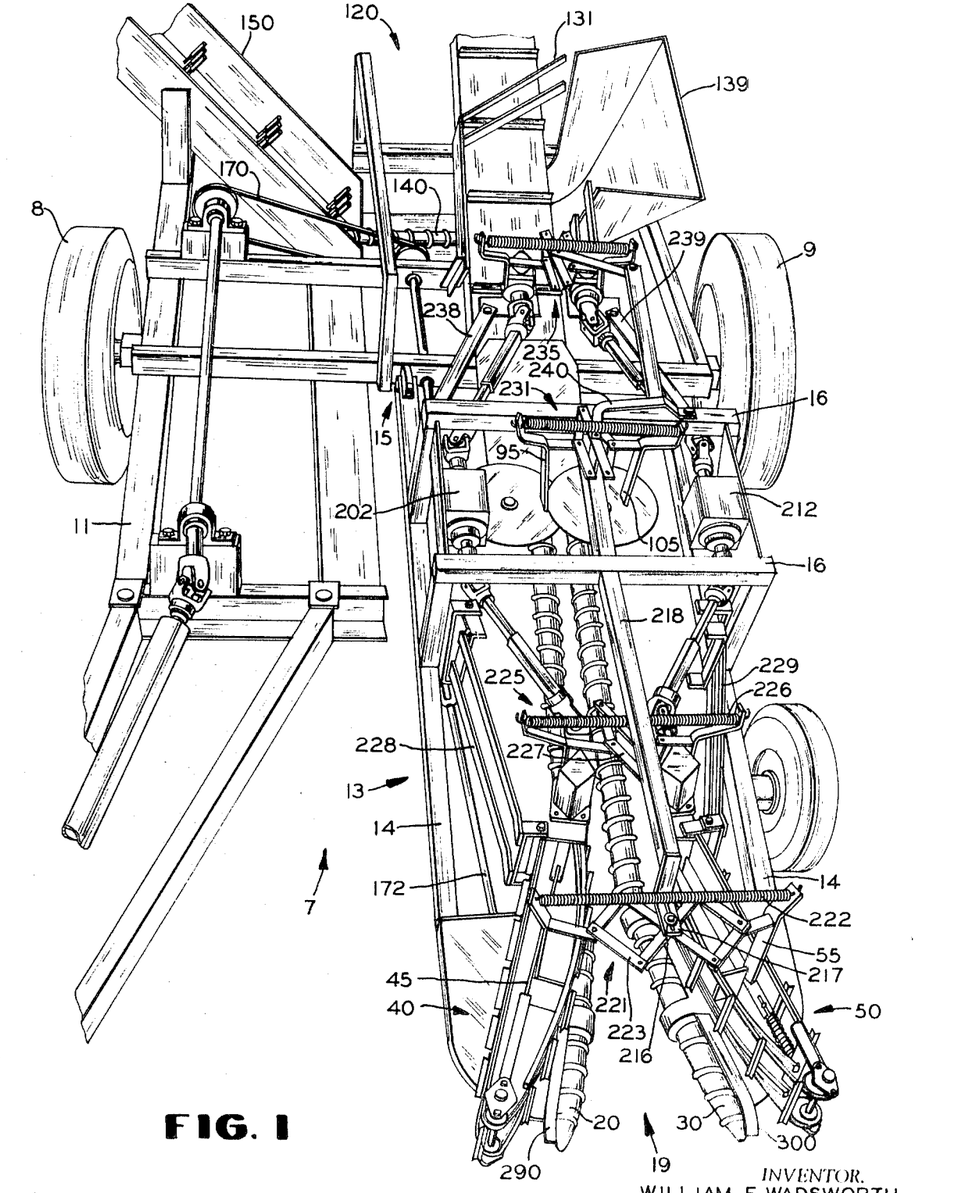
FIG. 1 is a view in perspective from the front and above, of apparatus embodying the teachings of this invention, in which the rear aligning conveyors have been omitted to permit showing of the other coacting features of this invention more clearly.

As best seen in FIG. 1 upward extensions of support frames 45, 55 are connected by a spring 222 of the biasing means 221 and by an accordion positioner 223. The relative position of the accordion positioner 223 is maintained by a slot-sliding bolt arrangement 216 in an extension 217 of support brace 218. The support brace 218, slot-bolt arrangement 216 also maintains the gathering conveyors 40, 50 at a desired height above the roller conveyors 20, 30. Further the slot-bolt arrangement 216 insures that the opposing runs 41, 51 maintain a centering position with respect to the main augers 60, 70 and the lifting rollers 20, 30.

Similarly, upward extensions of support frame 45, in this instance gearboxes attached to drive rear shafts 43, 53, are connected by spring means 226 and, with accordion positioner means 227, comprise the second biasing means connecting the rear portions of the gathering conveyors 40, 50. Support struts 228, 229 are pivotally connected to the forward cross brace 16 of the tilting frame 13 and to the rear portions of the support frame of the gathering conveyors 40, 50. The swinging support struts control the height of the rear portions and thus, in combination with the support brace 218, controls the height of both the rear and the forward portions of the gathering conveyors 40, 50. The pivotal supporting of support struts 228, 229 permits the rear portions, and thus the front portions, of the gathering conveyors 40, 50 to move inwardly and outwardly to accept various head sizes.

Thus the forward portions of the gathering conveyors 40, 50 are maintained in an opened gathering and receiving position and, with the biasing means 221, 225, yieldingly holds the gathering conveyor 40, 50 in a predetermined spaced relationship to insure a sufficient separation to permit entry of a head therebetween and the adjustment of the spacing along the opposing runs 41, 51 to accommodate different size heads as centering and orientation takes place.

The opposing runs 41, 51 of gathering conveyors 40, 50 are preferably driven at a conveying rate faster than the ground movement of the carriage to permit gathering and centering of a head before the grasping means arrives at the stem thereof. Since the runs of the conveyor must cover a longer oblique distance than the straight ahead run of the carriage the speed should be faster than the carriage speed. Each run advantageously carries a plurality of outwardly extending elements 48, 58 on their respective runs to permit positive engagement of a run with a head.

The stem-grasping conveying means includes coacting conveyor rollers shown in FIGS. 1, 2, 3 and 4 as a left main auger 60 and a right main auger 70. The grasping rollers carry spiral ribs 62, 72 thereon to assist in the conveying and grasping action thereof. The rollers rotate toward each other and downwardly to provide a firm grasp and a centering action on the head as the head and stem are conveyed back toward the cutter means 80. The grasping conveyor rollers are advantageously driven at a conveying rate substantially equal to the ground speed of the carriage. The grasping conveyor rollers 60, 70 advantageously converge slightly toward each other from the front portion thereof toward the rear portions to permit the entrance and engagement of a variety of stem sizes while still providing a grasping action.

For best results, the front ends of augers 60, 70 are advantageously spaced further apart than the diameter of the largest stem expected. Thus as the head is conveyed back by the spiral ribs 62, 72, the coacting rollers gradually apply a grasping or downward pull on the stem as the rollers converge toward each other. If the full grasping or downward pulling force is applied all at once, the sudden application of force may result in a snapping of the stem, particularly with certain varieties, and thus loss of control of the head and stub.

Figure 2:
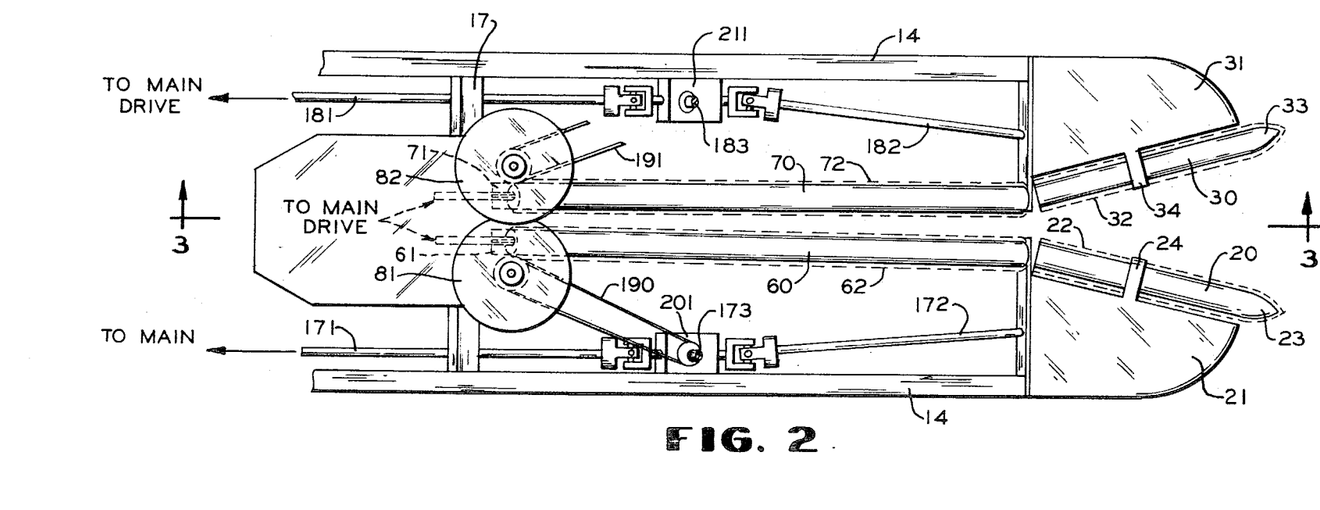
FIG. 2 is a plan view of a portion of a tiltable frame including the pickup, orienting and cutting stations of this invention as shown in FIG. 1.

As best seen in FIGS. 2 and 3, at the end of the conveyor roller 70 nipper blades 71 cooperate with nipper blades 61 at the end of roller 60 beneath the cutter means to forcibly grasp and eject severed stems to prevent the mechanism from jamming.

Figure 6:
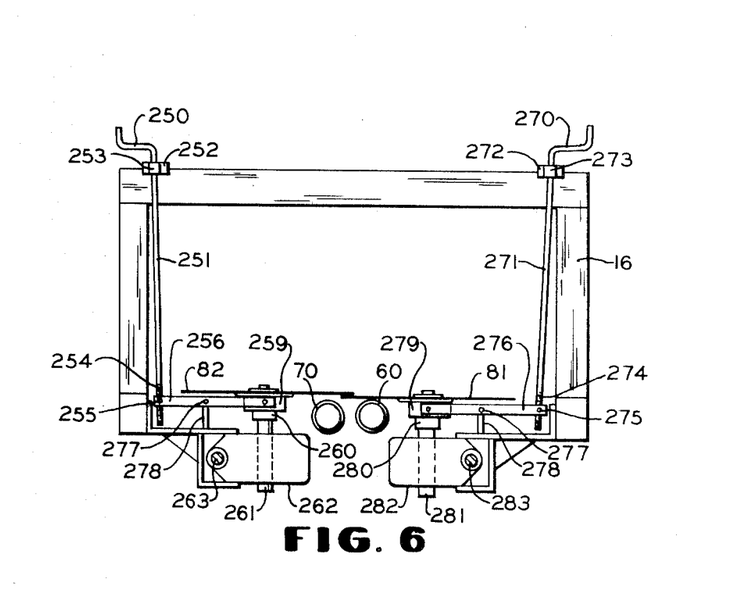
FIG. 6 is an illustration of means for adjusting the height of the cutters to selectively remove more or less of the stem and the outer leaves of the cabbage head.

Referring to FIG. 6 there is illustrated means for adjusting the height of the cutter means 80 which includes a left cutter blade 81 and a right cutter blade 82, above the grasping and conveying means to permit selective removal of stems only and/or stems along with a selected number of outer leaves.

Crank handles 250, 270 attached to shafts 251, 271 are journally supported in yokes 252, 272 and their vertical disposition is maintained by collars 253, 273 secured to shafts 251, 271 and held by the yokes.

The lower ends of shafts 251, 271 are screw threaded at 254, 274 and are received in tapped apertures in crossmembers 255, 275 pivotally supported in lower yoke elements 256, 276 which are in turn pivotally supported at 257, 277 on support members 258, 278 secured to the frame.

The other ends of lower yoke elements 256, 276 are pivotally attached to bearing members 259, 279 which receive shafts 261, 281 of the disc knife cutters 82, 81. Collars 260, 280 cooperate with the blades 82, 81 to maintain the bearing members 259, 279 at a predetermined position on shafts 261, 281.

Operation of the crank handles 250, 270 rotates shafts 251, 271 in and raises or lowers elements 255, 275. The other ends of lower yoke elements 256, 276 are thus lowered or raised and the height of blades 82, 81 above main augers 70, 60 is changed as desired.

FIG. 6 also shows a method of driving blades 82, 81. Gearboxes 262, 282 may be connected to drive shafts 261, 281, the gearboxes receiving their motive power from shafts 263, 283 extending toward the rear of the unit and advantageously driven by, or by the same sources as, links 178, 177 which drive main augers 70, 60.

Figure 4:
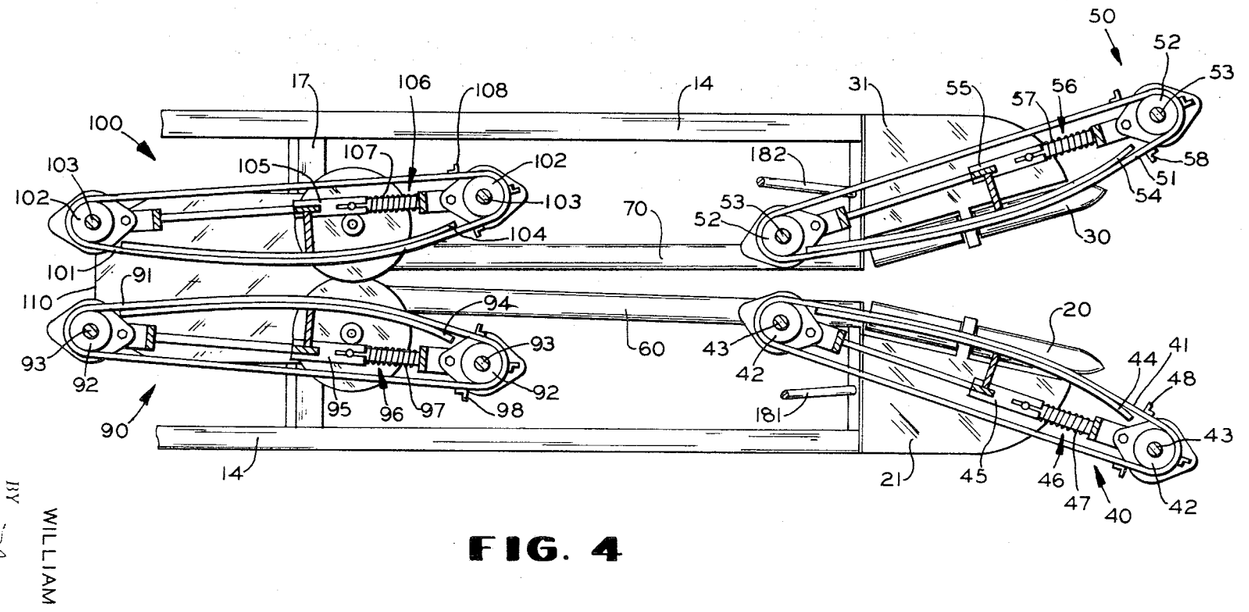
FIG. 4 is a plan view of the apparatus illustrated in FIG. 2 in which the details of and the positioning of the front or forward gathering conveyors and the rear or aligning conveyors are illustrated.

As illustrated in FIG. 4, although omitted from FIG. 1 in the interest of clarity, a second aligning means comprising endless aligning conveyors 90, 100 having substantially vertically disposed and rearwardly moving runs 91, 101 supported in spaced opposing relationship above the grasping means 60, 70 and the cutting means 80 to hold a head in a predetermined position for cutting the stem at a desired angle. While the cutting angle of a stem from a head is desirable in market cabbage for the purposes of appearance, it is crucial when harvesting kraut cabbage since the cut of the stem from the head must be made at a substantially right angle with respect to the junction of the stem with the head so that the coring knives in a kraut plant will not slip off an angled cut and injure or otherwise destroy the cabbage head and/or jam the coring machines. Thus, the aligning conveyors 90, 100 cooperate with the grasping rollers 60, 70 to hold the heads during the cutting to provide the right angle cut desired.

As noted hereinbefore with the gathering conveyors, the opposing runs 91, 101 of the aligning conveyors 90, 100 are arched toward each other by track means 94, 104 attached to support frames 95, 105 to insure a positive grip on the head as it is directly above the cutting means 80, without regard to heads within the aligning conveyors before and after the cutting station, or the size of those heads.

The aligning conveyors 90, 100 are driven at substantially the same conveying rate as the grasping means in order to most effectively align the cabbage heads and stems without abrading or causing a misalignment because of varying speed. As described hereinbefore with respect to the gathering conveyors 40, 50 the aligning conveyors 90, 100 each include end shafts 93, 103 journally supported in frame means 95, 105. The frame means 95, 105 include telescoping sections 96, 106 and spring means 97, 107 for yieldingly biasing the telescoping section to maintain a predetermined tension on the run of the conveyor.

Sprocket means 42, 52, 92, 102 for all the conveyors are mounted on shafts 43, 53, 93, 103 to guide chain and/or belt means and drive same on the conveyors 40, 50, 90, 100, respectively. This provides a positive pickup and, in cooperation with transverse elements 48, 58 and 98, 108, allows positive grasping and centering of heads, which provides advantages in handling certain varieties over the use of ordinary endless belts. Endless belts may be used in other applications.

As described hereinbefore for the gathering conveyors 40, 50 means are provided for yieldingly biasing the opposed runs 91, 101 of the aligning conveyors 90, 100 in a predetermined spaced relationship to insure a sufficient separation to permit entry of a head therebetween and the adjustment of the spacing along the runs to accommodate different size heads. The yieldingly biasing means 231 is connected to upper extensions of support frames 95, 105 of aligning conveyors 90, 100 (the upper extensions of frames 95, 105 being best seen in FIG. 1 though the aligning conveyors 90, 100 are omitted for purposes of clarity).

A first yieldingly biasing means 231 includes a spring means and an accordion positioner supported by support brace 240 which is connected to cross brace 16 to perform the same function as noted hereinbefore as support brace 218. Similarly, a second yieldingly biasing means 235 is connected to driving means mounted on extensions from support frames 95, 105 and includes a spring means and an accordion positioner means, the function of the yielding biasing means 235 for the rear portions of aligning conveyors 90, 100 being the same as or similar to the function of biasing means 225 for gathering conveyors 40, 50.

The portions of the aligning conveyors 90, 100 are supported by strut means 238, 239 which are pivotally connected to cross brace 16 and to the rear portions of the aligning conveyors 90, 100 in the same manner that support struts 228, 229 are connected to a cross brace 16 in the rear portions of conveyors 40, 50. The function and operation of support struts 238, 239 is the same as the functions of support struts 228, 229.

The opposing runs 91, 101 of aligning conveyors 90, 100 carry outwardly extending elements 98, 108 to insure a positive engagement of the head by the opposing runs. The aligning conveyors and the opposing runs thereof are advantageously sufficiently long to carry a severed head to a collecting station at the rear of the machine.

A slide plate or surface 110 to the rear of the cutting means and below the aligning conveyor 90, 100 prevents a small head disposed between two larger heads from escaping from the control of the aligning conveyors 90, 100 before reaching a collecting station, since a larger head following a preceding smaller head will push the smaller head before it to the collecting station.

A collection station for the apparatus described for receiving a severed head comprises a collecting conveyor 130 and diverting means 131 spaced above a collecting conveyor for pushing a head from the collecting conveyor while permitting loose leaves to be carried on by the the conveyor and dumped over the end of the machine. A collecting bin 139 receives heads diverted from the collecting conveyor 130 an a bin conveyor means 140 moves the heads to a discharge position adjacent elevator means 150. The bin conveyor means preferably comprises a plurality of spaced tubular conveyor rollers, similar to the main augers 60, 70 but more widely separated, which convey the heads while permitting loose leaves still with the heads to fall between the rollers.

Figure 7:
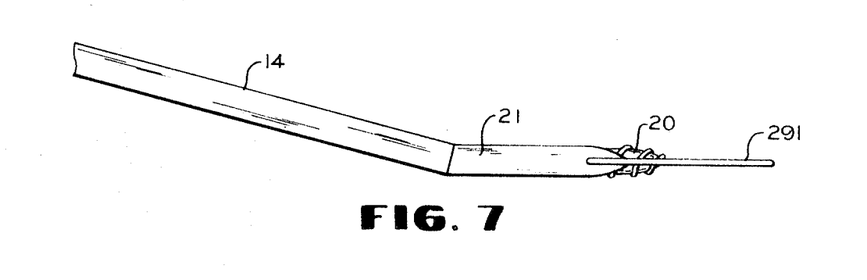
FIGS. 7 and 8 illustrate an alternative embodiment of the pickup station.
Figure 8:
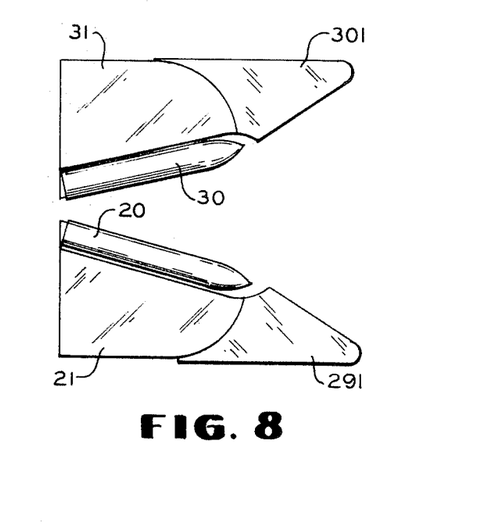

Referring to FIGS. 7 and 8 side and plan views illustrate an alternative embodiment of the pickup station. In FIG. 1 guards 290 and 300 overlay a portion of the rollers 20 and 30 to prevent small pebbles from lodging between the rollers and the housings 21, 31. The guards 290, 300 may be extended ahead of rollers 20, 30 and provide a means for initially pushing a head of cabbage back toward the center of the row, if the growth of the stem has placed the head an abnormal distance to the side of the row.

Similarly, guides 291, 301 in FIGS. 7 and 8 are operative to initially move a seriously displaced head back toward the center of the row. By using guide means such as 291, 301 or extended guards 290, 300, it is possible to avoid having to extend rollers 20, 30 to the same length, since the lifting action on the head becomes most necessary when the head approaches the center of the row and the convergence of rollers 20, 30.

It should also be noted that in FIG. 7 housings 21, 31 and thus rollers 20, 30 may be secured to frame members 14 at an angle which places the rollers substantially parallel to the ground level. This embodiment permits avoiding to a large extent the pickup of stone and other debris.

Figure 5:
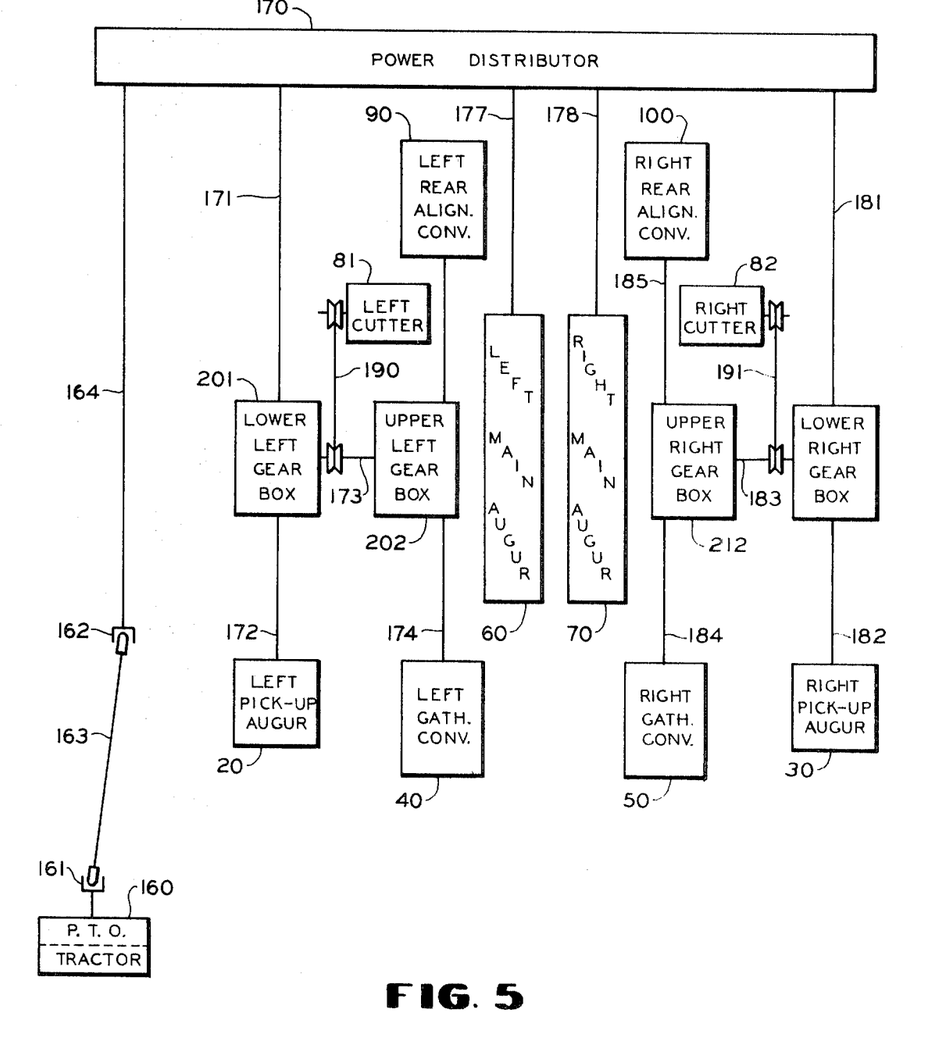
FIG. 5 is a diagrammatic layout of the power distribution and driving means for this invention.

Referring to FIG. 5 there is illustrated a diagrammatic layout of the power drive for the system. Since the apparatus is preferably geared to the speed of the carrier the pulling or driving means for the entire machine may be a tractor 160 having a power takeoff section. The power takeoff section may be connected via universal joints 161, 162 and mechanical linkage 163, 164 to a main drive or power distributor 170.

A mechanical link 171 drives the lower left gearbox 201. A mechanical link 172 provides a drive for the left pickup auger 20 from the lower left gearbox 201. A mechanical link from gearbox 201 drives the upper left gearbox 202 via link 173. The left front-gathering conveyor 40 is driven by gearbox 202 via mechanical link 174. The left rear aligning conveyor is driven from gearbox 202 via mechanical link 175. The left cutter blade 81 is driven by a sprocket and pulley arrangement 190 from the mechanical link 173.

The left and right main augers 60 and 70 are driven by mechanical links 177, 178 which may be connected directly to the main drive 170. The lower right gearbox 211 is powered by a mechanical link 181. The right pickup auger 30 is driven by gearbox 211 via mechanical link 182. The upper right gearbox 212 is powered by mechanical link 183 from gearbox 211. The upper right gearbox 212 drives the right gathering conveyor 50 and the right rear aligning conveyor 100 via mechanical links 184, 185, respectively. The right cutter 82 is driven by sprocket and pulley arrangement 91 from mechanical link 183.

It is to be noted that connecting means such as universal joints may be used and are intended to be included in any mechanical link shown as a straight connection, since the position of the components being driven on the tilting frame or the main frame may require something other than a straight drive shaft.

There has thus been generically described herein machinery for harvesting vegetables having an edible portion and an undesirable or unedible portion to be separated therefrom comprising a carriage adapted to be advanced on the ground along a row of vegetables. Cutter means on the carriage are utilized for severing the undesirable portion from the edible portion. Means are provided for lifting up and separating the edible portion from the ground. Means for grasping and pulling the undesirable portion up tight against coacting conveyor rollers acts to convey the undesirable and edible portions to the cutter means. Means are provided for orienting the undesirable portion and the edible portion for engagement by the grasping means.

The orienting means as shown herein may include endless gathering conveyors having vertically disposed opposing runs supported in spaced relationship on each side of the row to contact and center the edible portion for engagement of the undesirable portion by the grasping means. The apparatus may further include a means for aligning and holding the edible portions while the grasping means moves the undesirable portions through the cutting means.

In conclusion, it is pointed out that while the illustrated examples constitute practical embodiments of the invention, it is not intended to limit the invention to the exact details or dimensions shown or discussed, since modifications may be made without departing from the spirit and scope of the invention disclosed.

I claim:

1. A machine for harvesting vegetables having an edible head portion to be separated from a stem portion comprising a carriage to be advanced on the ground along a row of vegetables, cutter means on said carriage for trimming the stems from the heads, coacting conveyor roller means on said carriage extending from a position adjacent the ground back to and below said cutter means for grasping and pulling down on a stem while conveying the stem and the head resting on said conveying means to said cutter means, means for orienting the head of a vegetable in said row to present the stem for engagement by said conveyor roller stem grasping means, and movable aligning means above said conveyor roller stem grasping means and said cutter means for receiving and holding a head in a predetermined position for cutting the stem at a desired angle, said aligning means being spaced rearwardly from said head orienting means so that a head and stem ride a distance on said coacting conveyor roller means to permit further orientation and seating of the head on and by said coacting conveyor roller means.

2. A machine as defined in claim 1 which further includes nipper rolls disposed beneath said cutter means for forcibly ejecting severed stems to prevent jamming.

3. A machine as defined in claim 1 which further includes means for adjusting the height of said cutter means above said grasping means to permit selective removal of stems only and stems along with outer leaves.

4. A machine for harvesting vegetables having an edible head portion to be separated from a stem portion comprising a carriage adapted to be advanced on the ground along a row of vegetables, cutter means on said carriage for trimming the stems from the heads, means on said carriage extending from a position adjacent the ground back to and below said cutter means for grasping and pulling down on a stem while conveying the stem and the head resting on said conveying means to said cutter means, and movable means separate from said stem grasping and head-conveying means for orienting the head of a vegetable in said row to present the stem for engagement by said stem-grasping means including coacting lifter conveyor rollers having forward portions supported in spaced relationship on each side of said row to be advanced beneath a head portion.

5. A machine as defined in claim 4 in which said lifting conveyor rollers have rear portions which converge toward each other to feed a stem and head to said stem-grasping means.

6. A machine as defined in claim 5 which includes means for driving said lifting conveyor rollers at a conveying rate in excess of carriage speed to permit centering of the head and stem by both rollers at the convergence thereof before engagement by said stem-grasping means.

7. A machine as defined in claim 4 in which said lifter conveyor rollers carry spiral ribs thereon to assist in the lifting and conveying action thereof.

8. A machine as defined in claim 4 which further includes a housing for supporting each said lifter conveyor roller and guard means extending over said lifter conveyor rollers disposed to prevent debris lifted by said rollers from lodging between said housing and a respective roller.

9. A machine as defined in claim 8 in which said guard means extends past the forward portions of said rollers to initially nudge heads back toward the center of a row.

10. A machine for harvesting vegetables having an edible head portion to be separated from a stem portion comprising a carriage adapted to be advanced on the ground along a row of vegetables, cutter means on said carriage for trimming the stems from the heads, means on said carriage extending from a position adjacent the ground back to and below said cutter means for grasping and pulling down on a stem while conveying the stem and the head resting on said conveying means to said cutter means, and movable means separate from said stem grasping and head conveying means for orienting the head of a vegetable in said row to present the stem for engagement by said stem-grasping means including endless gathering conveyors having substantially vertically disposed and rearwardly moving runs supported in spaced opposing relationship on each side of said row to contact an center said heads.

11. A machine as defined in claim 10 in which rear portions of the opposing runs of said gathering conveyors converge toward each other.

12. A machine as defined in claim 10 which further includes means for yieldingly biasing said opposed runs in a predetermined spaced relationship comprising at least two resilient means connected at spaced locations along the lengths of said runs.

13. A machine as defined in claim 9 which further includes biasing means yieldingly connecting said gathering conveyors intermediate the length of the opposing runs.

14. A machine as defined in claim 12 in which further includes second biasing means yieldingly connecting said gathering conveyors at the rear portions of said opposing runs.

15. A machine as defined in claim 10 which includes means for driving said opposing runs at a conveying rate faster than ground movement of said carriage to permit gathering and centering of a head before said grasping means arrives at the stem thereof.

16. A machine as defined in claim 10 in which each run carries means for positively engaging a head with the run.

17. A machine as defined in claim 10 in which the opposing runs of said gathering conveyors are arched toward each other to permit rapid initial coarse centering of a head, the rearward portions of said converging arches permitting coaction by the opposing runs for vernier-centering adjustments.

18. A machine as defined in claim 10 in which each gathering conveyor includes end shafts journally supported in a frame means, said frame means including a telescoping section and means for yieldingly biasing said telescoping section to maintain a predetermined tension on the run of said conveyor.

19. A machine for harvesting vegetables having an edible head portion to be separated from a stem portion comprising a carriage adapted to be advanced on the ground along a row of vegetables, cutter means on said carriage for trimming the stems from the heads, means on said carriage extending from a position adjacent the ground back to and below said cutter means for grasping and pulling down on a stem while conveying the stem and the head resting on the conveying means to said cutter means, means for orienting the head of a vegetable in said row to present the stem for engagement by said stem-grasping means, and movable aligning means spaced from said orienting means along said stem-grasping conveying means to permit further orientation of said head on said stem-grasping means before reaching said aligning means comprising endless aligning conveyors having substantially vertically disposed and rearwardly moving runs supported in spaced opposing relationship above said stem-grasping means and said cutting means to hold a head in a predetermined position for cutting the stem at a desired angle.

20. A machine as defined in claim 19 in which the opposing runs of said aligning conveyors are arched toward each other to insure a positive grip on the head directly above said cutting means.

21. A machine as defined in claim 19 which further includes means for yieldingly biasing said opposed runs of said aligning conveyors in said spaced relationship to insure a sufficient separation to permit entry of a head therebetween and the adjustment of the spacing along the runs to accommodate different size heads.

22. A machine as defined in claim 19 in which said aligning conveyors carry a severed head to a collecting station.

23. A machine as defined in claim 22 which further includes a surface to the rear of said cutting means and below said aligning conveyors to prevent a small head disposed between two larger heads from escaping from the control of said aligning conveyors before reaching a collecting station.

24. A machine for harvesting vegetables having an edible head portion to be separated from a stem portion comprising a carriage adapted to be advanced on the ground along a row of vegetables, cutter means on said carriage for trimming the stems from the heads, means on said carriage extending from a position adjacent the ground back to and below said cutter means for grasping and pulling down on a stem while conveying the stem and the head resting on the conveying means to said cutter means, movable means for orienting the head of a vegetable in said row to present the stem for engagement by said stem grasping means and a collecting station for receiving a severed head comprising a collecting conveyor and diverting means spaced above said collecting conveyor for pushing a head from the collecting conveyor while permitting loose leaves to be carried on.

25. A machine as defined in claim 24 which further includes a collecting bin for receiving heads from said collecting conveyor and a bin conveyor means comprising a plurality of spaced tubular conveyor rollers which convey the heads while permitting loose leaves to fall between the rollers.

26. A machine for harvesting vegetables having an edible head portion to be separated from a stem portion comprising a carriage adapted to be advanced on the ground along a row of vegetables, cutter means on said carriage for trimming the stems from the heads, means on said carriage extending from a position adjacent the ground back to and below said cutter means for grasping and pulling down on a stem while conveying the stem and the head resting on said conveying means to said cutter means, and means for orienting the head of a vegetable in said row to present the stem for engagement by said stem-grasping means including coacting lifting conveyor rollers having forward portions supported in spaced relationship on each side of said row to be advanced beneath a head and endless gathering conveyors having substantially vertically disposed and rearwardly moving runs supported in spaced opposing relationship on each side of said row to contact and centerheads.

27. A machine as defined in claim 26 which further includes second conveying means comprising endless aligning conveyors having substantially vertically disposed and rearwardly moving runs supported in spaced opposing relationship above said grasping means and cutting means to hold a head in a predetermined position for cutting the stem at a desired angle.

28. A machine as defined in claim 12 which further includes means for yieldingly biasing said opposing runs of each of said gathering and aligning conveyors in a predetermined spaced relationship, said biasing means including accordion-type positioners and spring means for urging said accordion positioners to a predetermined extended position.

29. A machine as defined in claim 28 which further includes means for retaining the center of said accordion positioner in alignment with a centerline between said opposing runs of said gathering conveyors.

30. A machine as defined in claim 26 in which the stem-grasping means comprises coacting grasping conveyor rollers and means for rotating said grasping rollers to pull a stem down and between the same, and in which the front portions of said grasping conveyor rollers are spaced sufficiently far apart and converge together toward said cutter means so that a grasping force is not suddenly applied to a stem entering between said grasping rollers but rather said force is gradually applied thereto as said grasping rollers converge.